United States Patent [19]

Yamamoto et al.

[11] Patent Number: 4,751,546
[45] Date of Patent: Jun. 14, 1988

[54] DISPLAY DEVICE FOR CAMERAS

[75] Inventors: Katuhiko Yamamoto; Takeshi Yoshino; Michihiro Shiina; Shigenori Goto; Masayoshi Hirai; Shiro Hashimoto, all of Saitama; Hisashi Hamada, Tokyo, all of Japan

[73] Assignee: Fuji Photo Film Co., Ltd., Kanagawa, Japan

[21] Appl. No.: 914,084

[22] Filed: Sep. 30, 1986

[30] Foreign Application Priority Data

Sep. 30, 1985 [JP] Japan ............................ 60-147962[U]
Feb. 25, 1986 [JP] Japan ............................ 61-25214[U]

[51] Int. Cl.⁴ ...................... G03B 11/00; G03B 17/24; G03B 15/01; G03B 17/18
[52] U.S. Cl. .................................... 354/468; 354/475; 354/106; 354/127.1; 354/215; 340/753; 340/756
[58] Field of Search ............... 354/468, 471, 472, 474, 354/475, 105, 106, 109, 127.1, 127.11, 127.12, 215, 217, 218, 289.1, 289.12, 214, 216; 340/753, 756, 765

[56] References Cited

U.S. PATENT DOCUMENTS

| | | | |
|---|---|---|---|
| 3,914,758 | 10/1975 | Irgle | 340/753 X |
| 3,956,758 | 5/1976 | Numata et al. | 354/474 |
| 3,988,069 | 10/1976 | Kitaura | 354/474 |
| 4,200,896 | 4/1980 | Baumann | 340/756 X |
| 4,203,103 | 5/1980 | Osada et al. | 340/756 X |
| 4,237,373 | 12/1980 | Okatani et al. | 235/92 EV |
| 4,291,960 | 9/1981 | Ito et al. | 354/475 |
| 4,292,509 | 9/1981 | Sato et al. | 235/95 MP |
| 4,432,628 | 2/1984 | Sakurada et al. | 354/289.12 |
| 4,461,560 | 7/1984 | Yoshino et al. | 354/475 |
| 4,623,234 | 11/1986 | Shimizu et al. | 354/475 X |

FOREIGN PATENT DOCUMENTS

| | | | |
|---|---|---|---|
| 53-43044 | 11/1978 | Japan . | |
| 54-5297 | 3/1979 | Japan . | |
| 60-33545 | 2/1985 | Japan . | |
| 176027 | 9/1985 | Japan | 354/106 |
| 194434 | 10/1985 | Japan | 354/471 |

Primary Examiner—W. B. Perkey
Attorney, Agent, or Firm—Young & Thompson

[57] ABSTRACT

A display device for a camera has a display panel with a digital display unit having seven display segments disposed in a figure-eight shape. The digital display unit displays the number of exposed frames or other exposure information, and in addition, a portion of display segments is utilized for display or for indicating an alarm condition of the camera. In order to clearly recognize the display or alarm of the camera conditions, a character or symbol representative of the display content or alarm content is disposed near a display segment used for both numerical display, and camera condition display or alarm. A display of the film winding state is performed by flashing the laterally elongated display segments positioned between patterns formed sideways of the digital display unit and symbolizing a film supply section and a film winding section.

12 Claims, 5 Drawing Sheets

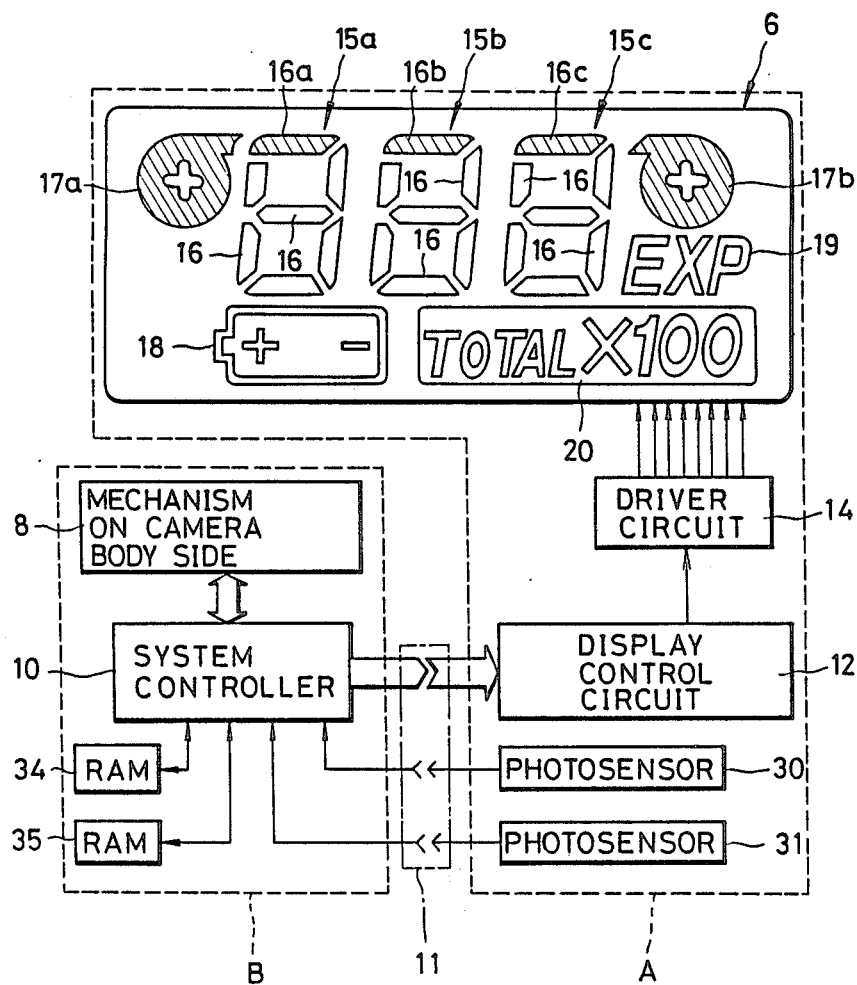

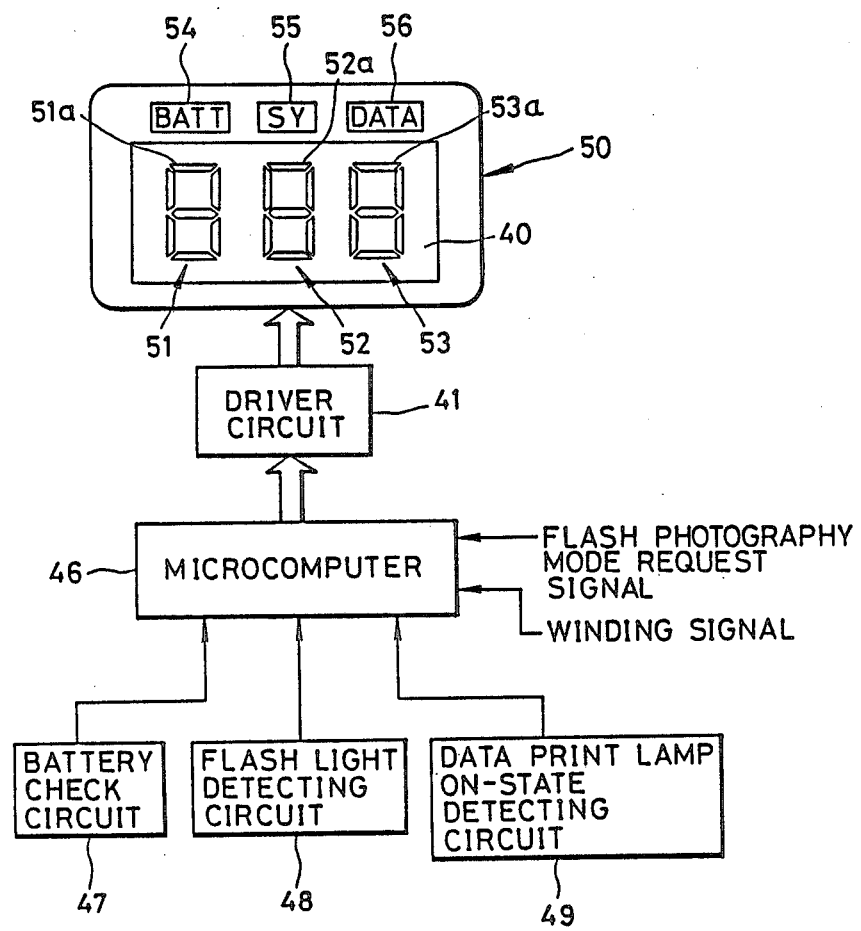

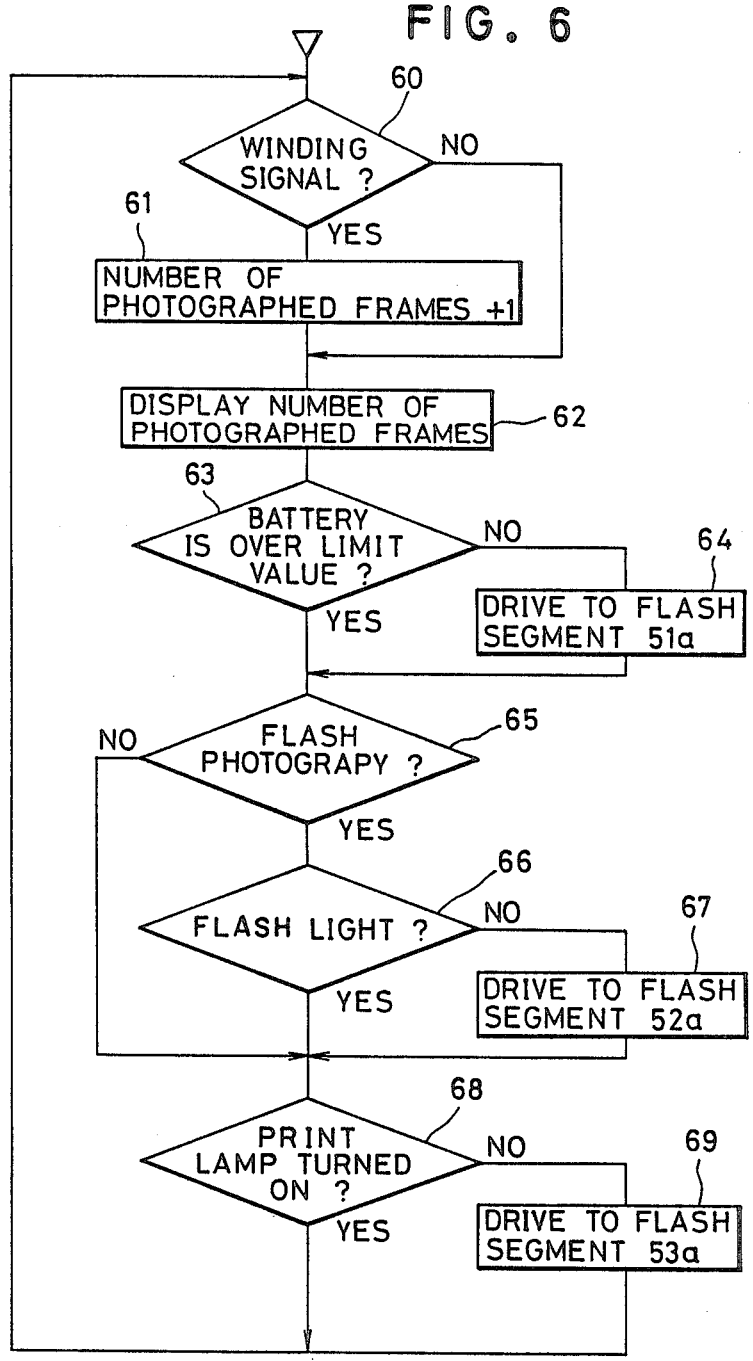

DISPLAY DEVICE FOR CAMERAS

BACKGROUND OF THE INVENTION

The present invention relates to a display device for a camera, and more particularly to a display device wherein by using selected display segments of a digital display unit for display of a numeral such as the number of photographed frames or an exposure value, various information such as film winding condition and battery condition can be displayed.

Generally, a camera is provided with an information or alarm display device which displays information or gives an alarm necessary for proper photographing, or is provided with a device which displays the condition of the mechanism of the camera. Among such display devices, there are known a shutter speed display device, a diaphragm setting display device, an improper exposure alarm display device, an exposed frame number or a remaining frame number display device, a film winding display device, a battery condition display device and so on. Liquid crystals, light emission diodes, lamps or the like are used with these display devices.

Recently, there has been a tendency to display information and give an alarm collectively on a single display panel. For instance, there is known a display device having a single liquid crystal panel on which an exposure information display section, a frame number display section, a film winding display section, a patrone presence display section, a photographing mode display section and the like are provided. The exposure information display section and the frame number display section are constructed of a plurality of digital display units each having seven display segments disposed in a figure-eight shape. The film winding display section is constructed of a plurality of display segments aligned on a line wherein these display segments are sequentially flashed while a film is wound or rewound to simulate the film advance. Other display sections are adapted to display characters, marks and the like.

In case various information or an alarm is to be displayed on a single display panel, the number of display segments must be increased if the number of types of information or alarm increases, thereby necessarily making the size of the display panel large. Also, the greater the number of display segments, the greater the number of driving terminals to be mounted on the display panel, which in turn leads to complicated circuitry.

OBJECTS OF THE INVENTION

It is a principal object of the present invention to provide a display device for a camera capable of displaying various information or alarm without making the display panel large in size, by using in common a part of a digital display unit displaying numerical data.

It is another object of the present invention to provide a display device for a camera which is simple in construction.

SUMMARY OF THE INVENTION

To achieve the above and other objects and advantages of the present invention, a display device for a camera is constructed such that a part of the display segments of a digital display unit for displaying the number of frames or exposure information, is used and flashed so as to display film winding, indication of the need for battery replacement, flash malfunction, date printing lamp malfunction, ready state of a flash, and so on.

According to a preferred embodiment of the present invention, display patterns indicating a film supply section and a film winding section are provided sandwiching a plurality of digital display units disposed for display of numerals of plural digits. While winding the film, those laterally elongated display segments of respective digital display units located at the same level are sequentially flashed to simulate the film winding state.

According to another embodiment of the present invention, characters or symbols representative of an alarm or display content are provided over or under the digital display units whereby at least one display segment of the digital display units is flashed to display the alarm or the display content.

BRIEF DESCRIPTION OF THE DRAWINGS

FIG. 3 is a schematic view illustrating a film winding state according to an embodiment of the present invention;

FIG. 5 is a more specific block diagram of the embodiment shown in FIG. 4; and

FIG. 6 is a flow chart illustrating the display operation of the display device of FIG. 5.

DETAILED DESCRIPTION OF THE INVENTION

Figure 1:
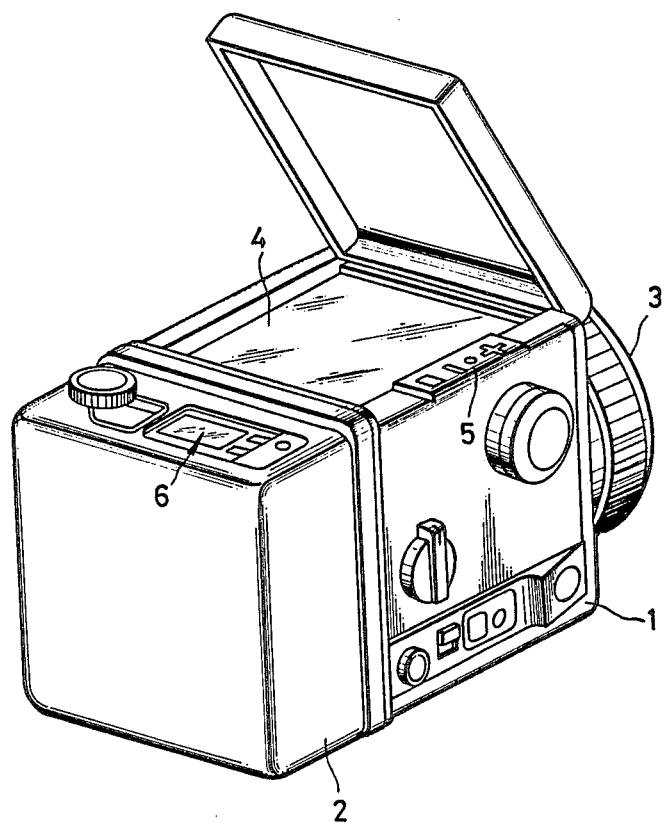
FIG. 1 is a perspective view of a film magazine replacement type camera to which the present invention is applied.

Referring to FIG. 1 showing a film magazine replacement type camera, in a magazine 1 mounted on a camera body 2 a Brownie-type film is loaded. On the camera body 2, there are mounted a taking lens 3 and a camera body side mechanism 8 (refer to FIG. 3) including a known shutter mechanism, diaphragm mechanism and the like. The operation of these elements is controlled by a system controller 10 comprised by a microcomputer. A connector 11 is provided between the camera body 2 and the film magazine 1 to transfer signals therebetween. The elements on the film magazine side are sequentially controlled by the system controller 10.

On the top of the camera body 2, a focussing plate 4 is mounted to permit a focussing adjustment or a framing while looking at an image on the plate 4. A display 5 is mounted adjacent one side of the focussing plate 4 for indicating a proper or an improper exposure. On the top of the film magazine 1 is mounted a liquid crystal display panel 6 which has a display pattern as shown in FIG. 3 and is controlled through the system controller 10, connector 11, display control circuit 12, and driver circuit 14. In FIG. 3, the circuit block surrounded by broken line A is assembled on the film magazine 1 side, while the circuit block surrounded by broken line B is assembled on the camera body 2 side.

The display pattern of the liquid crystal panel 6 is composed of laterally aligned, three digital display units 15a to 15c each of which is constructed of seven segments 16 disposed in a figure-eight shape. Thus, a numeral of three digits can be displayed. The uppermost display segments 16a to 16c of the digital display units 15a to 15c are aligned.

Patterns 17a and 17b symbolizing the film reels are mounted on opposite sides of the display segments 16a to 16c. Other patterns include a battery pattern 18, a pattern 19 for indicating completion of exposure preparation, and a pattern 20 for indicating a multiplication factor for use with the total number of photographed frames.

Figure 2:
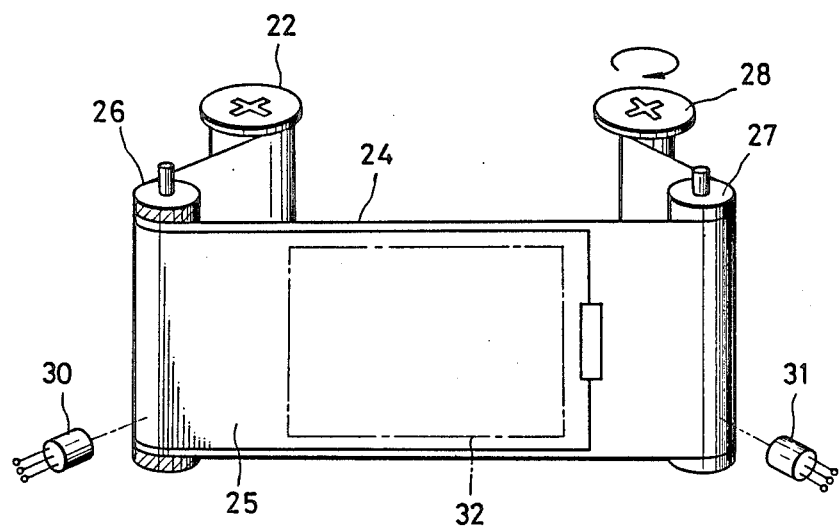
FIG. 2 is a perspective view showing an example of a film winding mechanism mounted in a film magazine.

FIG. 2 is a schematic view showing the film winding mechanism within the film magazine 1. A back sheet 24 and a film 25 wound about a film supply reel 22 are wound about a winding reel 28 by means of follower rollers 26 and 27 disposed on opposite sides of an exposure aperture 32. As is well known, the winding reel 28 is driven by a motor which is controlled by the system controller in a predetermined sequence with respect to the camera body side mechanism 8.

The surface of the follower roller 26 is coated with a low reflective sheet, while that of the follower roller 27 is coated with a high reflective sheet. Near the surfaces of the follower rollers 26 and 27, reflection type photosensors 30 and 31 are mounted which use light to which the film is not sensitive. Since the surface of the back sheet 24 is low reflective and that of the film 25 is high reflective, the film loading state can be monitored from the outputs of the pair of photosensors 30 and 31. Thus, assuming that the output of the photosensor 30 or 31 is "H" when a high level of reflected light is detected and "L" when a low level of reflected light is detected, the outputs and the film loading state are related to each other as in Table 1.

TABLE 1

| Photosensor 30 | Photosensor 31 | Loading State |
| --- | --- | --- |
| L | H | Film not loaded |
| L | L | Film loaded winding of first frame in progress |
| H | H | Film loaded, photographing enabled |
| L | H | Film consumed winding of last frame in progress |
| L | L | Winding of film trailer (back sheet) in progress |
| L | H | Completion of film winding |

The same combinations in Table 1 are discriminated as to the particular film loading state, depending upon at what time, during the sequence program stored in the system controller 10, the combination is detected.

The operation of the liquid crystal panel 6 constructed as above is as follows:

First, when a power switch of the camera is turned on while no film is in the film magazine 1, the outputs of the photosensors 30 and 31 are respectively "L" and "H" and are sent via the connector 11 to the system controller 10. The outputs supplied to the system controller 10 at the initial stage of the sequence program are referenced to the data stored in a ROM of the system controller 10, which supplies a signal for displaying the film-not-loaded state to the display control circuit 12. The driver circuit 14 is actuated to flash the patterns 17a and 17b to indicate the film-not-loaded state.

If the outputs of the photosensors 30 and 31 are "L" and "L", it means that although a film has been loaded, the first frame is not yet wound to a preset position. In this case, a winding start signal from the system controller 10 causes the winding reel 28 to be driven and simultaneously therewith, a film leader winding signal from the system controller 10 is supplied to the display control circuit 10. Thereupon, the driver circuit 14 causes the patterns 17a and 17b as well as the uppermost display segments 16a to 16c of the digital display units 15a to 15c to flash, thereby indicating that the film is now being wound as shown by oblique lines in FIG. 3.

The end of winding the film leader is detected when the outputs of the photosensors 30 and 31 are "H" and "H". Thereafter, in accordance with the sequence program stored in the system controller 10, the camera body side mechanism 8 and the film magazine 1 side mechanism can be moved synchronously. In this case, on the liquid crystal panel 6, the patterns 17a and 17b and the display segments 16a to 16c are turned off, the digital display unit 15c indicates "1", and the pattern 19 turns on, thereby indicating the completion of preparation for exposing the first frame.

Upon actuation of a shutter button, the camera body side mechanism 8 operates to expose the film and "1" is stored in RAM 34. After a first exposure completion signal is outputted to the film magazine 2 side from the system controller 10, the film winding reel 28 is driven to advance the film by one frame by means of a known film winding mechanism. During this period, the system controller 10 sends a film winding signal to the display control circuit 12, so that on the liquid crystal panel 6 the patterns 17a and 17b turn on and the display segments 16a to 16c flash, as already described, thereby to indicate the film winding state. After the film has been advanced by one frame, a digital value "2" is displayed on the digital display unit 15c and the pattern 19 turns on, thereby to indicate the completion of preparation to expose a second frame.

Photographing is repeated in the above manner, and from the 10th frame the digital display unit 15b is used to display a numeral of two digits. After use of the last frame and passage of the end of the film 25 over the follower roller 26, the back sheet is then exposed so that the outputs of the photosensors 30 and 31 become a combination of "L" and "H". In this state, an "END" pattern indication is displayed on the digital display units 15a to 15c. After the trailer of the back sheet passes over the follower roller 27, the outputs of the photosensors 30 and 31 become "L" and "H", respectively, thereby signalling the end of film winding. At this time, as in the film not-loaded state, the patterns 17a and 17b flash to indicate such a state.

The number of exposed frames for each film is counted and stored in RAM 34 which is reset after the end of film winding, as described previously. RAM 35 connected to the system controller 10 is used as an accumulation counter for the number of exposed frames and stores the total number of exposures. The count of RAM 35 is displayed on the digital display units 15a to 15c in units of three digits when a total number display switch mounted at a desired position on the camera body 2 is actuated. If the count is expressed in four digits or more, the pattern 20 is used together with the digital display units 15a to 15c.

The pattern 18 is used for indication of battery condition, and turns on when the battery has a voltage level higher than a predetermined value and flashes when it reaches a predetermined level. In case of an abnormal state which is beyond the normal sequence program stored in the ROM of the system controller 10, the patterns 17a and 17b as well as the display segments 16a to 16c may be flashed, or any one of the digital display units 15a to 15c can be flashed, to indicate an abnormal state.

For displaying the film winding state, the display segments 16a to 16c may be sequentially turned on starting from the left to simulate the actual film winding state. Furthermore, the liquid crystal display panel 6 may be mounted on the camera body 2 side to display digitally the shutter speed, the diaphragm value and the like on the digital display units 15a to 15c including the display segments 16a to 16c. Furthermore, for displaying the film winding state, instead of using the uppermost display segments 16a to 16c of the digital display units 15a to 15c, the laterally elongated display segments 16 at the middle or bottom level may be used. In this case, the patterns 17a and 17b are preferably mounted at the level of those selected display segments 16.

Figure 4:
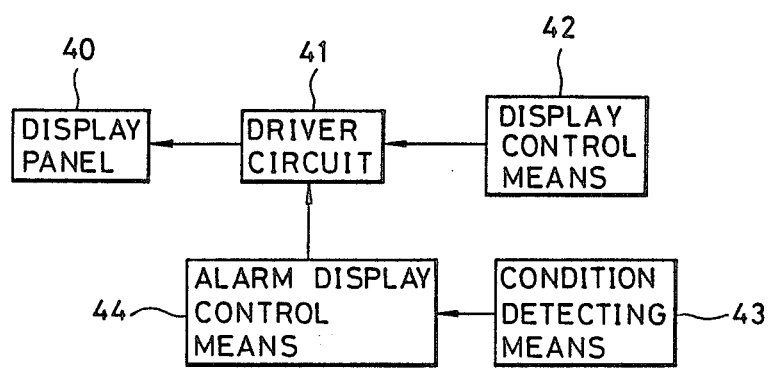
FIG. 4 is a block diagram of the circuit for displaying an alarm according to an embodiment of the present invention.

In the above embodiment, the film loading state is displayed using the digital display units which selectively display the number of exposed frames and the total number of exposures. However, other information or an alarm may be displayed. FIG. 4 is a block diagram of an embodiment wherein an alarm display is additionally displayed. A liquid crystal display panel 40 is constructed of a plurality of digital display units and driven by a driver circuit 41. The number of exposed or remaining frames is usually displayed in response to a signal from display control means 42. Condition detecting means 43 detects the condition of the entire system of a camera, and a signal representative of the condition is supplied to alarm display control means 44. Alarm display control means 44 makes a part of the display segments of the digital display units flash if condition detecting means 43 detects an abnormal or improper condition of the camera, thereby providing an alarm display while discernibly displaying a numeral.

FIG. 5 shows a particular example of an alarm display. A microcomputer 46 is supplied with a film winding signal and a flash photography mode request signal as well as signals from a battery check circuit 47, a flash light detecting circuit 48 and data print lamp on-state detecting circuit 49. The film winding signal is supplied when an exposure is completed. The flash photography mode request signal is, as well known, automatically supplied in response to an external manipulation or in accordance with an exposure value. The battery check circuit 47 checks if the voltage of a battery housed in the camera and serving as a power source for the entire camera system is over a predetermined value or not. The flash light detecting circuit 48 detects the emission of a flash lamp. The data print lamp on-state detecting circuit 49 detects turning on or off of a lamp for use in printing data such as the date. The battery check circuit 47, the flash light detecting circuit 48 and the data print lamp on-state detecting circuit are well known.

A liquid crystal panel 40 of a display 50 is driven by the driver circuit 41. The liquid crystal panel 30 has three digital display units 51, 52 and 53 and can display a numeral of three digits. Each of the digital display units 51, 52 and 53 is constructed of seven segments. Just above the display segments 51a, 52a and 53a of the digital display units 51, 52 and 53 and outside of the liquid crystal panel 40, discrimination symbols 54, 55 and 56 are displayed for example by means of printing. The discrimination symbol 54 is a word "BATT", the symbol 55 is a word "SY", and the symbol 56 is a word "DATA". "DATA" is for a data print abnormal condition, namely, that the data print lamp is not turned on.

"SY" is for a flash light emission abnormal condition, namely, that the lamp has not flashed. "BATT" is for a battery abnormal condition, namely, that the voltage of the battery is lower than the predetermined value. The symbol "DATA" corresponds in position to the upper display segment 53a of the digital display unit 53. The display segment 53a is driven to flash when the data print lamp has not turned on at the proper time. The symbol "SY" corresponds in position t5o the upper display segment 52a of the digital display unit 52. The display segment 52a is driven to flash when the flash lamp has not flashed at the proper time. The symbol "BATT" corresponds in position to the upper display segment 51a of the digital display unit 51. The upper segment 51a is driven to flash when the battery voltage falls to the predetermined value.

FIG. 6 is a flow chart showing the display control operation. The operation of the embodiment shown in FIG. 5 will be described with reference to FIG. 6. When a winding signal is inputted upon completion of an exposure, step 60 follows step 61 wherein the number of exposed frames is incremented by one. The number of exposed frames is counted by an internal counter of the microcomputer 46. A display processing for displaying the number of exposed frames on the liquid crystal panel 40 via the driver circuit 41, is performed (step 62), followed by step 63.

In step 63, a judgment is made whether the battery voltage is higher than the predetermined value, based on a signal detected by the battery check circuit 47. In case of a voltage lower than this predetermined value, step 64 follows wherein a flash processing for the display segment 51a of the liquid crystal panel 40 is performed. The user can detect this low voltage of the battery by noting the flash of the display segment 51a and the symbol "BATT" 54 just above the display segment 51a. After this processing, step 65 follows wherein a judgment is made whether a flash photography mode exists. In case of a higher value of the battery voltage than that predetermined value, step 65 follows.

A judgment whether a flash photography mode exists is made based on the presence or absence of a flash photography mode request signal. If a flash photography mode request signal is present, then step 66 follows. In step 66, based on a signal detected by the flash light detecting circuit 48 when a command to energize the flash lamp during an exposure is given, it is judged whether the flash lamp has flashed. In the case of no flash, step 67 follows after step 66, wherein flash processing for the display segment 40a of the liquid crystal panel 40 is performed. The user will be informed that the flash lamp was not energized, by the flashing of the display segment 52a and the symbol "SY" 55 disposed just above the display segment 52. After this processing, step 68 follows. In case the flash lamp was energized during an exposure, or where a flash photography mode request signal is not present during step 65, then step 68 follows.

In step 68, based on a signal detected by the data print lamp on-state detecting circuit 49 during data printing, it is judged whether the data print lamp has turned on or not. If the lamp has not turned on during data printing, step 69 follows after step 68, wherein flash processing for the display segment 53a of the liquid crystal panel 40 is performed. The user will be informed, by the flashing of the display segment 53a and the symbol "DATA" 56 just above the display segment 53a, that the data print lamp did not turn on. After this processing, the flow returns to step 60. In the case where the data print lamp is turned on, the flow returns directly to step 60. If another winding signal is not inputted at step 60, the operation jumps from step 60 to step 62 to repeat the above operations.

In the above embodiment, low battery voltage, non-flashing of the flash lamp, and turning-off of the data print lamp have been explained by way of example. However, the present invention is not limited thereto, but is applicable to other abnormal conditions of the entire system of a camera, such as displaying an indication of the time when the main capacitor of the flash circuit has been charged. Furthermore, an alarm display can be effected, using the three upper display segments of the digital display units in the above embodiment. However, the present invention is not limited thereto, but the upper and lower display segments or side display segments of the digital display units may be used for display of an alarm indication. Furthermore, an alarm display may be effected by stopping the numerical display and flashing or continuously turning on the display segments 51a, 52a and 53a, alone. Also, the present invention can employ a digital display unit having LED display segments disposed in a figure-eight shape.

Although a film magazine replacement type camera has been depicted in the above embodiment, the invention is also applicable to 35 mm roll film type compact cameras. If a film winding state is to be displayed on such a compact type camera, a switch is provided which is synchronously operated upon by sprockets rotating while a film is transferred, so that on/off signals from the switch can be used as film advance signals.

It is to be understood that various other alterations and modifications may also be made by those skilled in the art without departing from the scope and spirit of the present invention.

What is claimed is:

1. A display device for a camera, comprising
   first and second rollers disposed on opposite sides of an exposure aperture of the camera and rotating in cooperative association with a film which is being wound, the surface of said first roller having a high reflectivity and that of said second roller having a low reflectivity;
   a first photosensor for applying light to the surface of said first roller and detecting light reflected therefrom;
   a second photosensor for applying light to the surface of said second roller and detecting light reflected therefrom;
   means for detecting whether a film is loaded, based on a comparison of output signal levels obtained from said first and second photosensors; and
   indicia means responsive to said detecting means for indicating whether a film is loaded.

2. A display device for a camera according to claim 1, in which said indicia means flashes if a film is not loaded.

3. A display device for a camera having a liquid crystal display panel with a plurality of digital display units displaying numerical data of plural digits, the digital display unit having seven display segments disposed in a figure-eight shape;
   patterns on the display panel symbolizing a film supply section and a film winding section respectively disposed beside a digital display unit for the highest digit and beside a digital display unit for the lowest digit;
   means for generating a signal while a film is winding; and
   means for flashing only a plurality of aligned laterally elongated said display segments one from each said digital display unit in response to said film winding signal.

4. A display device for a camera according to claim 3, wherein said flashing display segments comprise only the uppermost display segment of each said digital display unit.

5. A display device for a camera according to claim 3, and means for flashing said patterns symbolizing the film supply section and the film winding section when a film is not loaded.

6. In a display device for a camera having a liquid crystal display panel with a plurality of digital display units displaying numerical data of plural digits, the digital display unit having seven display segments disposed in a figure-eight shape; the improvement comprising
   a symbol on the display panel disposed adjacent each of said digital display units for displaying a display content or alarm content;
   a plurality of means, corresponding in number with the types of said display or alarm content, for detecting undesirable conditions of a camera and for generating corresponding signals; and
   means for flashing at least one of said display segments of said digital display unit adjacent said symbol, in response to a signal from a corresponding one of said detecting means.

7. A display device for a camera according to claim 6, wherein said flashing display segment is a laterally elongated one nearest to said symbol.

8. A display device for a camera according to claim 5, wherein said symbol is printed on a member surrounding said liquid crystal display panel.

9. A display device for a camera according to claim 6, wherein said detecting means detects that a date print lamp was not turned on.

10. A display device for a camera according to claim 6, wherein said detecting means detects that a flash lamp was not flashed.

11. A display device for a camera according to claim 6, wherein said detecting means detects that a battery voltage fell below a predetermined value.

12. A detection device for detecting whether film is loaded in a camera, comprising
    first and second rollers disposed on opposite sides of an exposure aperture of a camera and rotating in cooperative association with a film which is being wound, the surface of said first roller having a high reflectivity and that of said second roller having a low reflectivity;
    a first photosensor for applying light to the surface of said first roller and detecting light reflected therefrom;
    a second photosensor for applying light to the surface of said second roller and detecting light reflected therefrom; and
    means for detecting whether film is loaded, based on a comparison of output signal levels obtained from said first and second photosensors.

* * * * *